J. T. BEASLEY.
PEANUT DIGGER.
APPLICATION FILED SEPT. 5, 1917.

1,269,550.

Patented June 11, 1918.

Inventor:
John T. Beasley

UNITED STATES PATENT OFFICE.

JOHN T. BEASLEY, OF BLAKELY, GEORGIA.

PEANUT-DIGGER.

1,269,550.

Specification of Letters Patent.

Patented June 11, 1918.

Application filed September 5, 1917. Serial No. 189,715.

*To all whom it may concern:*

Be it known that I, JOHN T. BEASLEY, a citizen of the United States, residing at Blakely, in the county of Early and State of Georgia, have invented certain new and useful Improvements in Peanut-Diggers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a plow designed particularly for digging peanuts. It has for its object to provide a frame of a special construction affording lightness and strength and presenting the minimum of friction in passing through soil, and in which the peanuts and vines will pass rearwardly over elevated prongs while the soil will be distributed evenly over the area between opposite sides of the implement; also in which the base shoe and detachable share will be of substantially corresponding shape or outline presenting a V shaped cutting edge to the share and corresponding V shaped open space at the rear for the reduction of friction and prompt discharge of the soil separated from the peanuts and vines; also in which the base of the discharging fingers will be of a shape contributing to the formation or preservation of the open V shaped formation previously mentioned; and in which also strength will be given to the frame at the angle of the side uprights and the base shoe and an inclined cutting edge be provided at such point of union. In an implement of the character of this one in which the depth of cut is relatively small or light, it is of importance for efficiency of action that the implement possess lightness and stiffness or rigidity and present the minimum of frictional resistance to its progress through the soil and that the nuts and vines be separated as promptly as possible from the soil without affording an opportunity for the nuts and vines being covered by the soil raised by the digger or its shoe. With the view of meeting the requirements indicated the invention consists in the features hereinafter particularly described and then sought to be clearly defined by the claims, reference being had to the accompanying drawing forming a part hereof and in which—

Figure 1:
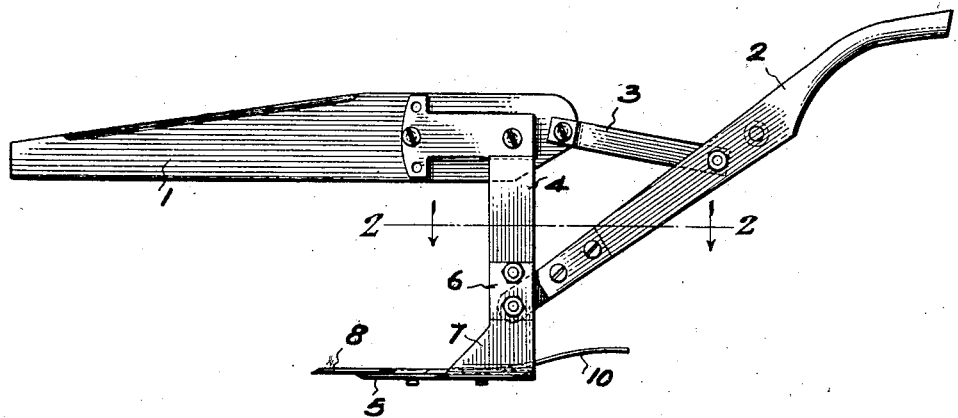
Figure 1 is a side view of the plow or digger.
Figure 2:
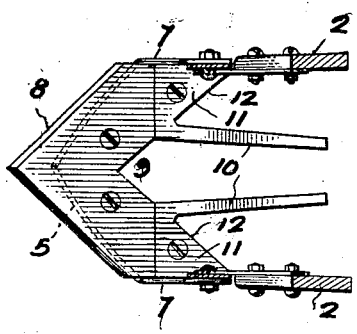
Fig. 2 is a horizontal section on the line 2—2 of Fig. 1.
Figure 5:
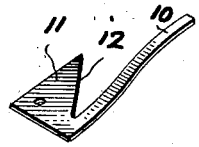
Fig. 5 is a central section through the lower part of the frame and base shoe.
Figure 3:
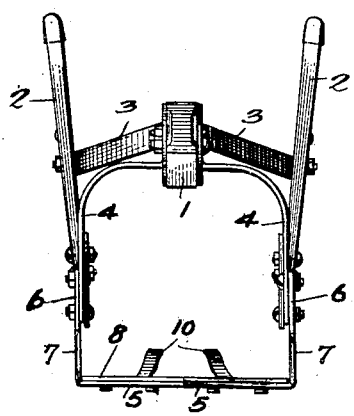
Fig. 3 is a front elevation.
Figure 4:
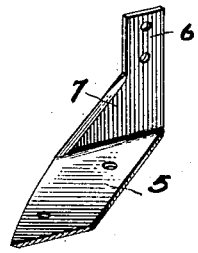
Fig. 4 is a perspective of one of the fingers.

In the drawing the numeral 1 designates the beam, 2 the handles, 3 connecting braces, and 4 the upper members of the arched frame bolted to the beam and having the uprights of the specially formed base member bolted thereto as illustrated. The base member of the frame comprises a base-shoe 5 of V shaped formation with the upright members 6 at the rear and opposite side thereof and with forwardly inclined webs 7 at the junction of the upright side members and base shoe so as to brace and stiffen the construction and present inclined cutting edges or members at those points, the front edges of the webs being sharpened for that purpose. To the base-shoe 5 is bolted a detachable share 8 of V shaped formation, front and rear, and projecting forwardly of the base shoe, the rear of the share having a V shaped recess 9, the edges of which match or correspond to the edges of the V shaped formation of the rear of the base-shoe. The rear of the diverging member of the share terminates in advance of the rear of the base-shoe and at the sides bears against the inner faces of the inclined web members 7. To the rear of the diverging members of the share are positioned fingers or prongs 10 having a slight upward inclination, and each finger or prong has a base wing 11 which has an inclined face 12 conforming to the inclined edge of the rear V shaped formation of the base-shoe. The wing rests on the rear of the base-shoe and has one edge bearing against the edge of the share and an edge bearing against the side of the inclined web 7, and is bolted to the base-shoe, all as clearly illustrated in Fig. 2 of the drawing. Each finger or prong is thus braced in position and held against lateral movement. By making the rear V shaped edge of the share and the rear edge of the wing of the prongs or fingers conform to the V shaped rear of the base-shoe a V shaped open space is formed to the rear of the base-shoe and share so that a minimum frictional surface contact between the soil, base-shoe and share is presented, and the soil promptly leaves the peanuts and vines which are directed rearwardly by the fingers or prongs.

By the features of construction specified, the implement is relatively light in weight, its elements contribute a bracing effect, one to the other, friction is reduced to a material extent, and efficiency increased.

Having described my invention and set forth its merits, what I claim is:

1. The peanut digger comprising the frame formed of upright members connected at the base one to the other by a V shaped base-shoe and having at the junction of the uprights and base-shoe forwardly inclined cutting-edge bracing webs, a detachable share secured to the base-shoe, and fingers extending rearwardly of the share.

2. The peanut digger comprising the frame provided with a V shaped base-shoe, a detachable V shaped share secured to the base-shoe, the rear edge of the share conforming to the rear edge of the base-shoe to form a V shaped open space at the rear of the shoe and share, and rearwardly extending fingers, each formed with a wing attached to the base-shoe and having a rear inclined face conforming to the rear inclined edge of the V shaped base-shoe.

In testimony whereof I affix my signature in presence of two witnesses.

JOHN T. BEASLEY.

Witnesses:
  H. B. AINSWORTH,
  R. W. ALEXANDER.

Copies of this patent may be obtained for five cents each, by addressing the "Commissioner of Patents. Washington, D. C."